United States Patent
Movshovitz-Attias et al.

(10) Patent No.: US 10,255,898 B1
(45) Date of Patent: Apr. 9, 2019

(54) AUDIO NOISE REDUCTION USING SYNCHRONIZED RECORDINGS

(71) Applicant: Google LLC, Mountain View, CA (US)

(72) Inventors: Yair Movshovitz-Attias, Mountain View, CA (US); Elad Edwin Tzvi Eban, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/059,293

(22) Filed: Aug. 9, 2018

(51) Int. Cl.
*H04R 3/00* (2006.01)
*G10K 11/16* (2006.01)
*G10K 11/178* (2006.01)
*H04R 1/00* (2006.01)

(52) U.S. Cl.
CPC ......... *G10K 11/17821* (2018.01); *H04R 1/00* (2013.01); *H04R 3/005* (2013.01); *G10K 2210/3051* (2013.01); *H04R 2430/00* (2013.01); *H04R 2499/11* (2013.01)

(58) Field of Classification Search
CPC . H04R 3/00; H04R 3/005; H04R 3/12; H04R 2410/05; H04R 2499/11; H04R 2430/00; H04R 2227/009; G10K 11/00; G10K 11/16; G10K 11/175; G10K 11/17821; G10K 2210/3051; G10L 21/00; G10L 21/02; G10L 21/0208; G10L 2021/02161
See application file for complete search history.

(56) References Cited

U.S. PATENT DOCUMENTS

| | | | |
|---|---|---|---|
| 5,825,899 A * | 10/1998 | Yamaguchi | G11B 20/10 381/94.4 |
| 8,615,394 B1 * | 12/2013 | Avendano | G10L 25/18 704/219 |
| 2007/0046503 A1 * | 3/2007 | van Baarsen | H03H 17/0621 341/50 |
| 2008/0240458 A1 * | 10/2008 | Goldstein | H04R 25/453 381/72 |
| 2009/0136045 A1 * | 5/2009 | Kim | H04R 3/12 381/17 |
| 2009/0204405 A1 * | 8/2009 | Kato | G10L 13/07 704/268 |
| 2011/0096631 A1 * | 4/2011 | Kondo | H04R 1/406 367/117 |

(Continued)

*Primary Examiner* — Thang V Tran
(74) *Attorney, Agent, or Firm* — McDonnell Boehnen Hulbert & Berghoff LLP (57) ABSTRACT

Audio recorded by a cellphone or other portable recording device (e.g., audio recorded as part of a video recording of a play or other event) is often of low quality, due to the limitations of the portable recording device. Multiple audio recordings, made during the same period of time and near the same location, can be combined to generate an improved-quality audio recording of an event. The audio recordings may be accessible to a server that selects the audio recordings and performs the combination. To protect the privacy of persons whose audio is used, more than a minimum number of recordings could be combined and/or no more than a threshold amount of any one recording could be used to generate a combined recording. Additionally, a provided 'clean' recording could include more than a threshold amount of the audio provided by a user or device that requests such a 'clean' recording.

20 Claims, 5 Drawing Sheets

(56) References Cited

U.S. PATENT DOCUMENTS

| | | | | |
|---|---|---|---|---|
| 2012/0185246 | A1* | 7/2012 | Zhang | G10L 21/0208 |
| | | | | 704/226 |
| 2012/0310650 | A1* | 12/2012 | Bonada | G10L 13/06 |
| | | | | 704/265 |
| 2015/0134342 | A1* | 5/2015 | Savvopoulos | G10L 21/0388 |
| | | | | 704/500 |
| 2015/0178387 | A1* | 6/2015 | Ozeroz | G06F 17/30749 |
| | | | | 707/739 |
| 2016/0210978 | A1* | 7/2016 | Chebiyyam | G10L 19/083 |
| 2018/0277099 | A1* | 9/2018 | Zou | G10L 15/063 |

* cited by examiner

AUDIO NOISE REDUCTION USING SYNCHRONIZED RECORDINGS

BACKGROUND

A variety of portable electronic devices, including cellphones, are configured to record audio and/or video under a wide range of circumstances and with minimal setup or forewarning. The ubiquity of such devices means that recordings are made, and often shared via the internet, of the full range of human activities and events.

However, these portable devices are often limited with respect to the quality of audio recording that can be generated. In particular, the microphones available on cellphones or similar devices are often limited with respect to quality, spectral response, noise rejection, distortion, and/or other factors. Accordingly, audio recordings made using such devices may be unsatisfactory, exhibiting distortion and noise from a variety of sources (e.g., from unwanted sound sources in the environment of the recording device). While filtering of such audio recordings may improve their quality, oftentimes such an individual audio recording contains insufficient information, on its own, to recover a high-quality representation of the desired audio signal.

SUMMARY

An aspect of the present disclosure relates to a method including: (i) receiving a target audio signal from a requestor device, where the target audio signal includes information indicative of sound sampled during a first period of time, where the first period of time includes a plurality of time segments; (ii) obtaining a set of source audio signals, where each of the source audio signals includes information indicative of sound sampled during at least a portion of the first period of time; (iii) for each time segment of the target audio signal, generating a respective segment of clean audio based on temporally-corresponding segments of the audio signals of the set of audio signals; (iv) smoothing the generated segments of clean audio to generate a smoothed audio signal; (v) combining the target audio signal with the smoothed audio signal to generate an output audio signal; and (vi) transmitting an indication of the output audio signal to the requestor device.

Another aspect of the present disclosure relates to a computer-readable medium (e.g., an article of manufacture including such a computer-readable medium, e.g., including a non-transitory computer-readable medium), having stored thereon program instructions that, upon execution by a computing device, cause the computing device to perform operations including: (i) receiving a target audio signal from a requestor device, where the target audio signal includes information indicative of sound sampled during a first period of time, where the first period of time includes a plurality of time segments; (ii) obtaining a set of source audio signals, where each of the source audio signals includes information indicative of sound sampled during at least a portion of the first period of time; (iii) for each time segment of the target audio signal, generating a respective segment of clean audio based on temporally-corresponding segments of the audio signals of the set of audio signals; (v) smoothing the generated segments of clean audio to generate a smoothed audio signal; (vi) combining the target audio signal with the smoothed audio signal to generate an output audio signal; and (vii) transmitting an indication of the output audio signal to the requestor device.

Yet another aspect of the present disclosure relates to a method including: (i) obtaining a target audio signal that includes information indicative of sound sampled during a first period of time, where the first period of time includes a plurality of time segments; (ii) obtaining a set of source audio signals, where each of the source audio signals includes information representative of sound sampled during at least a portion of the first period of time; (iii) for each time segment of the target audio signal, generating a respective segment of clean audio based on temporally-corresponding segments of the audio signals of the set of audio signals; (v) smoothing the generated segments of clean audio to generate a smoothed audio signal; and (vi) combining the target audio signal with the smoothed audio signal to generate an output audio signal.

Yet another aspect of the present disclosure relates to a method of reducing noise in audio data, the method including: (i) obtaining target audio data that includes information indicative of sound sampled during a first period of time in a first location, where the first period of time comprises a plurality of time segments; (ii) searching a data store to identify one or more items of source audio data each including information representative of sound sampled during at least a portion of the first period of time and within a threshold distance of the first location; (iii) for each time segment of the target audio data, generating a respective segment of clean audio data by combining the target audio data with one or more temporally-corresponding segments of source audio data; and (iv) combining the segments of clean audio data to generate output audio data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

The ubiquity of cellphones and similar devices has enabled a wide variety of events (e.g., concerts or other performances, fireworks displays, public speeches, family gatherings) to be captured to video. Unfortunately, the microphones available on cellphones or similar devices are often limited with respect to quality, spectral response, noise rejection, distortion, and/or other factors and thus may produce an unsatisfactory audio recording of an event.

However, an improved audio recording may be produced by combining multiple recordings, generated by respective different cellphones or other devices, that were generated at the same time and near the same location. In this way, the shortcomings of the individual devices could be overcome by pooling the information available in a collection of suboptimal-quality recordings. Such multiple recordings could be collected and combined, and the resulting improved audio recording disseminated, in a peer-to-peer fashion amongst the devices present at an event (e.g., via an ad hoc network). Additionally or alternatively, a cloud computing service (e.g., a cloud video storage and sharing service) could receive the multiple different recordings and combine them to generate an improved audio recording.

In order to combine multiple audio recordings in this way, the recordings may be selected from a pool of candidate recordings. The audio recordings could be selected based on a degree of temporal overlap with an event/time period of interest, based on GPS or other location information associated with the audio recordings, based on a similarity of the audio recordings to each other, based on user-generated tags or other user-generated metadata associated with the audio recordings, based on similarity between video recordings (or contents thereof) associated with the audio recordings, or based on some other indicia of similarity between audio recordings and/or contents thereof. Once selected, the audio recordings may be combined in a variety of ways, e.g., as a weighted linear combination of the selected audio recordings. The weights in such a weighted linear combination could be determined, e.g., using an artificial neural network or other machine learning algorithm.

The privacy of individuals whose audio recordings are used to generate such an improved audio recording of an event could be protected in a variety of ways. Such audio recordings could be restricted from such use unless the user has consented to such use (e.g., in order to access the improved audio recording generated therefrom). Improved audio recordings could be generated using no fewer than a minimum number of audio recordings (e.g., in order to reduce the contribution of any one recording to the resulting improved audio recording) and/or the weight of any one recording in a weighted linear combination of audio recordings could be maintained below a maximum value (e.g., in order to ensure that the contribution of any one recording to the resulting improved audio recording is less than the threshold amount). In this manner, the privacy of information (e.g. the content of a nearby conversation) that is present in some, but not all, of the recordings is protected. Additionally or alternatively, the improved audio recording provided to a particular user could include no less than a threshold amount of the user's own audio recording (e.g., the improved recording provided to a particular user could be a linear combination of the user's own original recording and a cleaned recording generated from multiple other users' recordings, with the user's original recording representing more than a minimum amount of the linear combination). In this manner, no user is able to ascertain private information (e.g. the content of a nearby conversation) that might be present in other users' recordings.

It should be understood that the above embodiments, and other embodiments described herein, are provided for explanatory purposes, and are not intended to be limiting.

II. EXAMPLE AUDIO RECORDING COMBINATION AND IMPROVEMENT

Audio recordings produced by a user (e.g., as part of a video recording of a student play produced using a cellphone) may exhibit distortion, noise, unwanted extraneous sounds (e.g., from nearby conversations unrelated to the object of the recording), or other unwanted contents related to low audio recording quality. In many situations where a user has produced such an audio recording (e.g., a concert, a play, a speech, a street performance, a fireworks show, a parade), multiple other users have also produced their own audio recordings (e.g., using their own cellphones or other audio/video recording devices). Since these multiple different recordings were taken at the same time, and near the same location, an "improved" audio recording could be produced by combining the multiple different recordings (e.g., by averaging the recordings together or performing some other linear combination of the recordings). The combined audio recording could then be made available, e.g., to those whose audio recordings were used to generate it, and/or a third-party.

Figure 1:
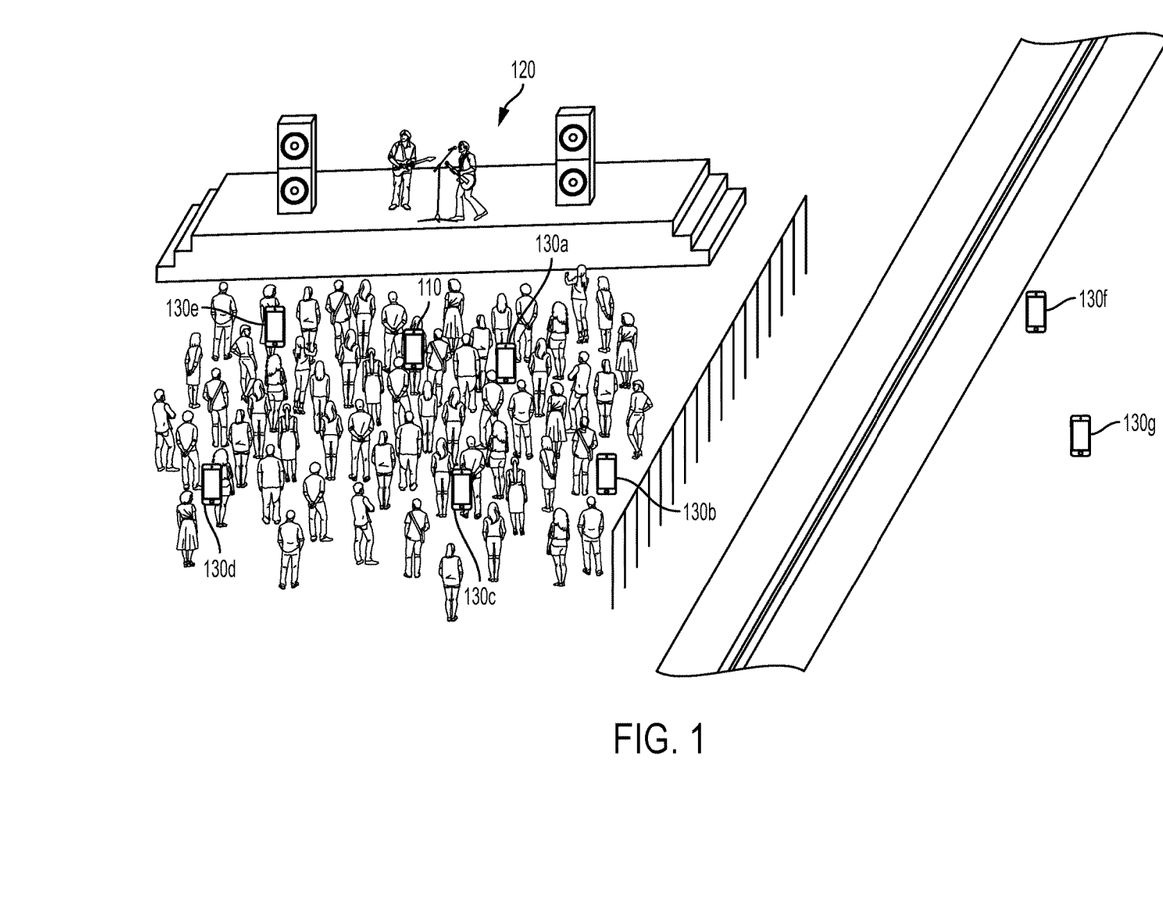
FIG. 1 depicts an example environment containing a plurality of devices.

Such a scenario is illustrated by way of example in FIG. 1. FIG. 1 shows a first user device 110 (e.g., a cellphone) that a user may use to make an audio recording (e.g., an audio recording that is part of a video clip) of an event 120 (e.g., a concert). One or more additional user devices 130a-e are present near the first user device 110 and thus could also be operated to generate an audio recording of the event 120. One or more user devices 130f-g may also be present far from the first device 110 (e.g., outside of the venue hosting the event 120 and across a street therefrom).

Accordingly, the audio recorded by the first device 110 and the nearby devices 130a-e may be similar, each containing information representative of the sounds of the event 120. However, these audio recordings are likely to differ due to, e.g., differences in local noise sources (e.g., conversations occurring near one of the devices and not others), noise inherent to the recording process (e.g., distortion and noise introduced by the microphone of the devices, noise introduced by amplification and sampling electronics), differences in location and orientation relative to the event 120 (e.g., proximity to one or more speakers generating sound for the event 120), or other differences. Conversely, audio recordings generated using the far devices 130f-g are unlikely to contain useful information about the sound of the event 120.

Note that the example scenario depicted in FIG. 1 (a music concert with numerous individuals in attendance having multiple devices capable of audio recording, and several additional audio recording-capable devices at relatively distant locations) is intended as a non-limiting example embodiment of an application of the systems and methods described herein. Systems and methods described herein could be applied to generate improved audio recordings for additional or alternative environments and/or events. For example, improved audio recordings could be generated based on audio recordings taken near a speech, a play, a musical concert, a political rally, a street performance, a fireworks display, an art installation, a presentation of a movie or other audio-visual recording, a race, a parade, or some other event. Such audio recordings could be generated in a theater, a music hall, an outdoor performance venue, a museum, a city street, a park, a subway car, the cabin of an airplane, or some other applicable environment wherein multiple users are operating respective audio recording devices to generate multiple recordings of sound in the environment.

Once such multiple audio recordings have been generated, a variety of systems could be applied to access and combine the recordings in order to generate an improved audio recording. For example, a number of audio recording devices (e.g., cellphones) could be part of a network (e.g., a peer-to-peer network formed for the purpose of securely sharing audio recording data for an event) and operate over the network to transmit audio recordings for the purpose of combining the recordings into improved audio recordings (e.g., in a distributed fashion and/or with one of the devices acting as a coordinator/server). In another example, a server and/or cloud computing service could receive audio recordings from multiple devices (e.g., as part of an audio and/or video uploading, storage, and/or sharing service or web site) and could operate to combine the recordings into improved audio recordings. Regardless of the implementation, the devices and systems employed to perform the methods described herein can include programming and/or electronics to protect the privacy of users who contribute their audio recordings to be combined. This can include only using audio recordings from users who have explicitly consented to such use (e.g., via a blanket consent, or on a per-recording basis) and/or who have consented to such use by requesting an improved audio recording based on a combination of their audio recording and the audio recordings of others who have similarly consented.

Once a set of recorded audio signals has been obtained and/or accessed, the audio signals can be combined, using the systems and methods described herein, to generate an improved audio signal for an event. This can include generating an improved audio signal for a particular target audio signal. For example, a particular user could transmit (e.g., from a cellphone or other requestor device), to a server or cloud computing service, a particular target audio signal along with a request for an improved version of the particular target audio signal. A number of available source audio signals, which at least partially overlap in time with the target signal, could then be combined and used to generate, for the target signal, an output audio signal that is improved relative to the target audio signal with respect to, e.g., a level of distortion, noise, Doppler-shifting, spectral filtering or distortion, audio feedback, under-sampling, low signal amplitude, or some other metric of audio quality. The target audio signal and the source audio signals may include audio-only recordings, or the audio portions of audio-video recordings (e.g. video clips), or any combination thereof.

Generating such an improved output audio signal can include selecting the source audio signals from a larger set of further audio signals that are available to a server, cloud computing system, or other system for implementing the methods described herein. The source audio signals could be selected based on a similarity between a relevant property of the source audio signals and the target audio signal. For example, location data (e.g., GPS coordinates) could be associated with the source audio signals and with the target audio signal, and the source audio signals could be selected based on proximity between the location associated with the target audio signal and the locations associated with the source audio signals (e.g., because source audio signals recorded near the location that the target audio signal was recorded are more likely to contain audio information useful in creating an improved version of the target audio signal). Source audio signals could be selected based on other criteria, e.g., based on a similarity between the source audio signals and the target audio signal (e.g., based on a correlation value determined between the source audio signal and the target audio signal), a degree of similarity between user-generated metadata (e.g., hashtags, keywords) and/or automatically-generated metadata associated with the source audio signals and metadata associated with the target audio signal, a degree of temporal overlap between the source audio signals and the target audio signal (e.g., selecting source audio signals that overlap in time with at least a threshold duration and/or percent of the target audio signal), a degree of similarity between video clips associated with the source audio signals and the target audio signals (e.g., a similarity between frames of associated video clips, or a similarity between machine-identified contents of the video clips), or some other similarity between the audio signals and/or between data associated with the audio signals.

Additionally or alternatively, source audio signals could be selected based on a determined quality of the source audio signals. For example, an audio quality value could be determined for each of the available audio signals (e.g., based on a signal-to-noise ratio, a signal amplitude and/or a signal spectrum). Audio signals having an audio quality value below a specified threshold value could be discarded or discounted from subsequent use or consideration in generating improved audio signals for a target audio signal.

The methods described herein could be used to select, from a plurality of available audio signals, a set of source audio signals that can then be used to generate, for a target audio signal, an output audio signal that is improved relative to the target audio signal with respect to signal-to-noise ratio, distortion, signal magnitude and/or some other characteristic of interest. The number of source audio signals selected could be specified in order to increase the quality of the output audio signal (by selecting more audio signals), to protect the privacy of individuals whose audio signals are selected to be part of the set of source audio signals (by selecting more audio signals), to reduce a computational cost of generating the improved output audio signal (by selecting fewer audio signals), or in consideration of additional factors.

In some examples, the target audio signal could be divided, across time, into a plurality of time segments. In such examples, a set of source audio samples could be selected for each of the time segments. The set of source audio signals could be selected such that each time segment is represented by at least a threshold number of the selected source audio signals.

Figure 2:
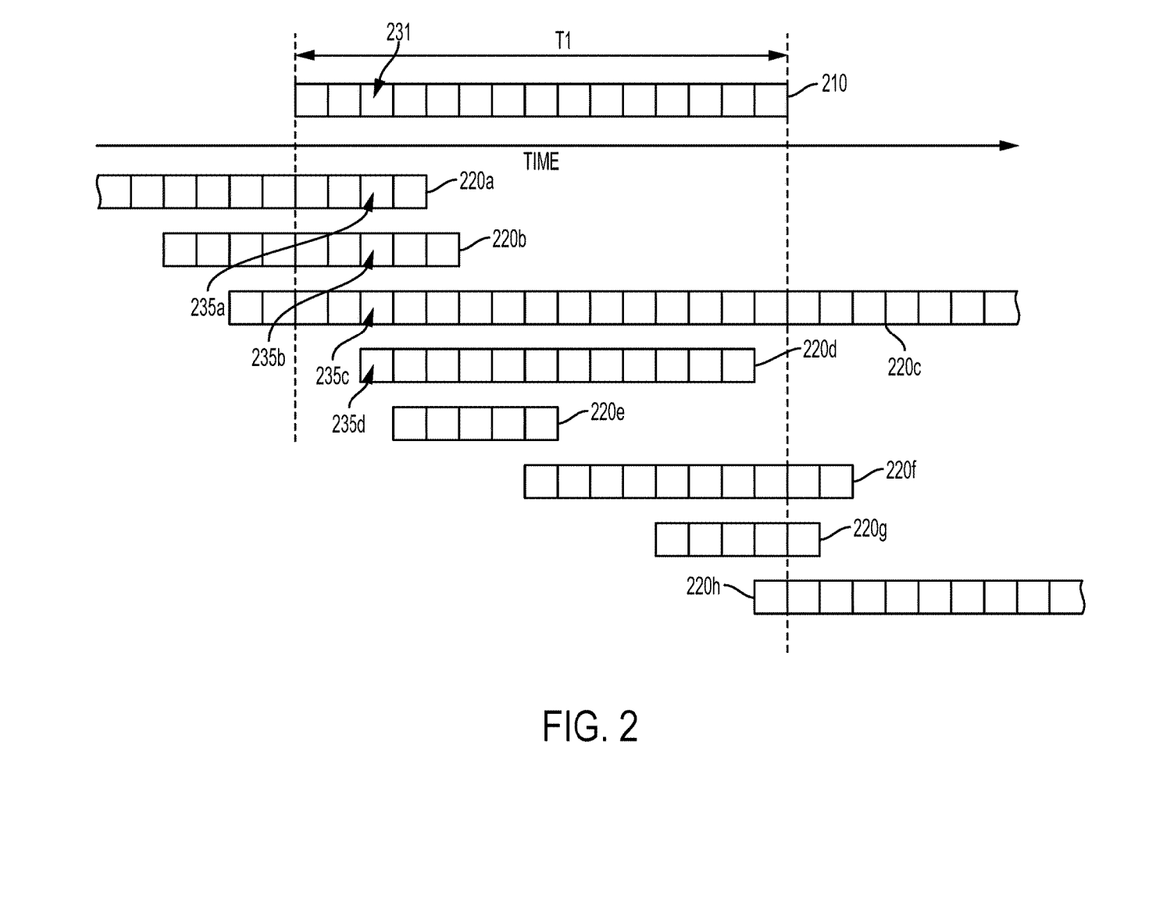
FIG. 2 depicts the timing of a plurality of audio signals, according to an example embodiment.

Such a scenario is illustrated by way of example in FIG. 2. FIG. 2 shows a target audio signal 210 that includes a plurality of time segments (including an example time segment 231) spanning a first period of time "T1." The target audio signal 210 includes information indicative of sound sampled during time period T1. A number of source audio signals 220*a-h* are also available, each of which at least partially overlaps with time period T1 (that is, each of the source audio signals 220*a-h* includes information indicative of sound sampled during at least a portion of time period T1).

The illustrated set of source audio signals 220*a-h* includes a number of source audio signals (three or more, by way of example in FIG. 2) representing each of the time segments of time period T1. For example, the example time segment 231 is represented by temporally-corresponding segments

235*a-d* of four of the source audio signals 220*a-h* (i.e., by temporally-corresponding segments of source audio segments 220*a*, 20*b*, 220*c*, and 220*d*). Accordingly, to create an improved output audio signal for the example time segment 231, some or all of the temporally-corresponding segments 235*a-d* could be combined or otherwise used. For example, the "best" three (or some other specified number) of the temporally-corresponding segments 235*a-d* (with respect to a determined audio quality, similarity to the target audio signal, similarity to a mean of the available audio signals, or some other metric of the particular temporally-corresponding segments 235*a-d* and/or of the source audio signals 220*a-d* as a whole) could be selected and used to generate a segment.

In order to use such "temporally-corresponding segments" of a source audio signal to generate an improved output audio signal, it is necessary to determine the temporal correspondence (i.e., the temporal offsets) between the source audio signals and/or the target audio signal. In some examples, this could include determining a temporal offset, relative to the target audio signals and/or some other reference time, for each of the source audio signals based on a timestamp or other timing information already associated with the source audio signals (e.g., based on a system clock and/or GPS clock available to a cellphone or other audio recording device that generated the source audio signal(s) and/or a known location of such devices relative to sound sources/other recording devices).

Additionally or alternatively, the contents of the audio signals could be used to determine the time offsets between the audio signals. This can be useful, e.g., in situations where different source audio signals were generated by audio recording devices located at different distances relative to an event or other sound source of interest. In such examples, it could be more advantageous to determine the temporal offsets between audio signals based on their audio contents (e.g., based on the relative timing of noises within the audio signals), rather than based on existing timestamps, as the audio contents of the audio signals may be offset relative to each other, and relative to the timestamps, due to the non-zero propagation time of sound in air. The time offsets between two example audio signals could be determined by, e.g., determining a cross-correlation between the two audio signals and then determining the time offset between the two audio signals based on a time delay that corresponds to a peak or other feature within the determined cross-correlation. Additionally or alternatively, loud and temporally short template sounds (e.g., sounds corresponding to drum beats, car horns, alarms, claps, or other short, peaked noises) could be identified in multiple audio signals and used to determine temporal correspondences between the multiple audio signals.

In some examples, a template audio signal could be selected from a set of available audio signals (e.g., from the set of selected source audio signal, from a set that includes both the source audio signals and the target audio signal). The template audio signal may be any segment of a source audio signal or the target audio signal with characteristics (e.g. frequency and/or amplitude characteristics) that are sufficiently distinctive to allow identification of corresponding segments of other audio signals in the set of available audio signals. A time offset could then be determined between the selected template audio signal, or a selected template portion thereof, and each of the non-selected audio signals (e.g., the other source audio signals, the target audio signal). The determined time offsets could then be used to determine the segment of a given source audio signal that temporally corresponds to a particular time segment of the target audio signal (e.g., in order to combine the temporally-corresponding segment of the given source audio signal with temporally-corresponding segments of other source audio signals in order to generate a segment of an improved output audio signal). The use of a template audio signal thus provides an effective and computationally efficient way of achieving time alignment between the template audio signal and one or more source audio signals.

The template audio signal and/or template portion of an audio signal could be selected by determining, for each potential audio signal and/or portion thereof, a peakedness value that corresponds to the presence of loud and/or sharp features within the potential template audio signals. The presence of such loud and/or sharp features within a template audio signal facilitates the determination of time offsets based on the template audio signal (e.g., by allowing such time offsets to be determined with less uncertainty and/or noise that is the time offsets were determined based on an alternative audio signal). Determining such a peakedness value for a particular audio signals and/or portion thereof could include identifying a maximal-magnitude time point within the particular audio signal (e.g., following thresholding the audio signal, to ensure that such a determined maximal-magnitude time point is greater than the threshold value); determining a magnitude of the particular audio signal at the maximal-magnitude time point; determining a median of the particular audio signal within a specified-duration time period that includes the maximal-magnitude time point (e.g., a 200 ms window about the maximal-magnitude time point); and determining a ratio between the determined magnitude and the determined median (e.g., discarding or discounting audio signals and/or portions thereof for which the ratio is less than a threshold value). The template audio signal and/or portion thereof could be selected as the signal with the highest determined ratio; alternatively, the template audio signal could be selected randomly from a set of audio signals whose determined ratio is greater than the threshold value.

An improved output audio signal could be generated for a target audio signal by generating, for each of a plurality of time segments of the target audio signal, a combination of temporally-corresponding segments of a set of source audio signals. For example, a segment of clean audio could be generated, for the example time segment 231 of the target audio signal 210 of FIG. 2, by combining some or all of the temporally-corresponding segments 235*a-d* of the source audio signals 220*a-d*. This could include using a generative artificial network to receive the temporally-corresponding segments of the source audio signals and to output the segment of clean audio.

Additionally or alternatively, the segment of clean audio could be generated by generating a linear combination of the temporally-corresponding segments of the source audio signals. This could include determining, for each of the temporally-corresponding segments of the source audio signals, a mixing coefficient and then generating the segment of clean audio by generating, according to the mixing coefficients, a linear combination of the temporally-corresponding segments of the source audio signals. A mixing coefficient may be any parameter that defines the relative contribution of a particular source audio signal to a segment of clean audio. These mixing coefficients could be determined for each of the time segments of the target audio signal such that the relative contribution of each source audio signal could vary from time segment to time segment (e.g., according to which source audio signals overlap with each time segment, the level of noise over time of each audio segment, the presence of unwanted sounds within each source audio signal over time, or other considerations). In order to protect the privacy of individuals who may have provided the source audio signals, the number of source audio signals used to generate any given segment of clean audio could be maintained at or above a specified threshold number (e.g., three). Additionally or alternatively, the determined mixing coefficients could be maintained below a specified maximum value (e.g., 0.15, 0.05) such that the generated segments of clean audio do not contain more than a maximum "amount" of any one contributor's audio.

The mixing coefficients could be determined using a long short-term memory recurrent neural network, e.g., by sequentially applying the temporally-corresponding segments of the source audio signals to the long short-term memory recurrent neural network in order to refine an estimate of the "true state" of the corresponding segment of clean audio. Such a long short-term memory recurrent neural network could be trained based on training data generated using a high-quality microphone and/or a plurality of additional (e.g., lower-quality) microphones distributed throughout an environment of interest. The audio signal recorded using the high-quality microphone could be used as the target signal when training the neural network to combine the audio signals recorded from the additional microphones. The audio signal recorded from the additional microphones could be degraded (e.g., noise added, spurious environmental noises added) before being used to train the neural network.

Once the segments of clean audio have been generated, they can be smoothed in order to generate a smoothed audio signal. This smoothing can be performed, e.g., in order to compensate for artifacts that may be present at the edges of the segments of clean audio due to changes in the mixing coefficients between subsequent time segments, changes in the identity of the source audio signals used to generate adjacent segments of clean audio, or to compensate for other sources of noise and/or distortion.

A variety of methods could be used to smooth such segments of clean audio. For example, the segments of clean audio could be filtered. In some examples, multiple overlapping sets of segments of clean audio could be generated. A smoothed audio signal could then be generated from such overlapping sets by generating, for each sample of the smoothed audio signal, a linear combination of samples from each of the sets of cleaned audio samples. The coefficients of such a linear combination could vary over time such that the output audio signal is smooth or otherwise minimizes noise or distortion.

Figure 3:
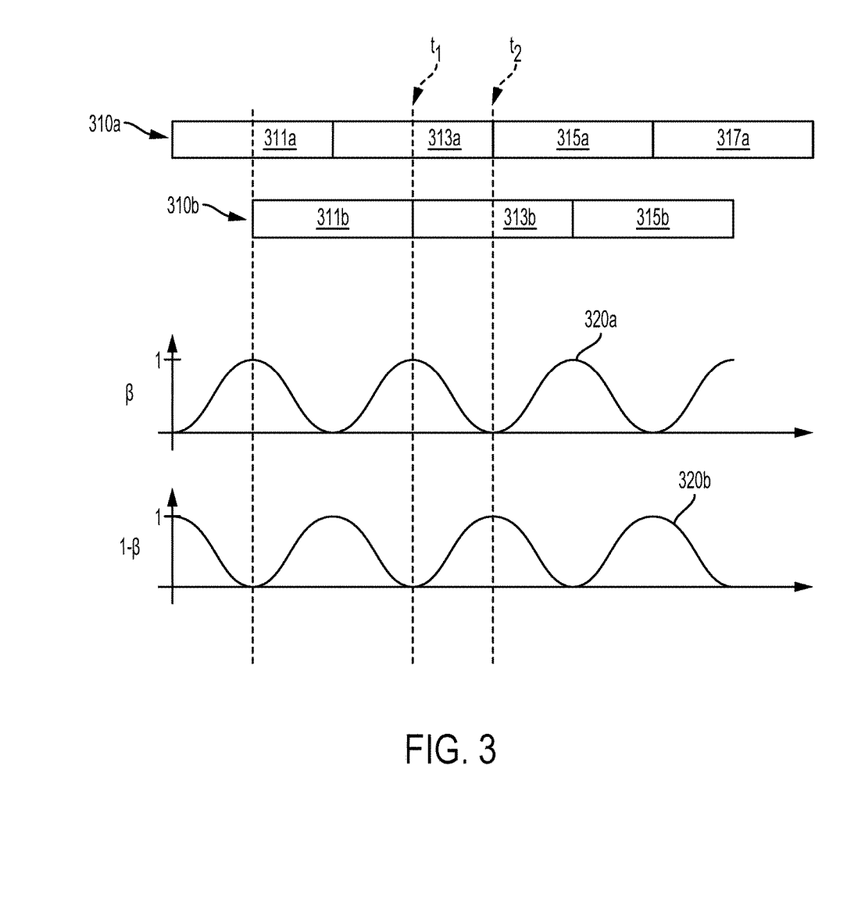
FIG. 3 depicts the timing of a plurality of audio signals and time-dependent coefficients for combining the audio signals, according to an example embodiment.

An example is illustrated in FIG. 3. FIG. 3 illustrates a first plurality of non-overlapping time segments 310a (including time segments 311a, 313a, 315a, 317a) and a second plurality of non-overlapping time segments 310b (including time segments 311b, 313b, 317b). Time segments of the first plurality 310a overlap in time with time segments of the second plurality 310b. Each time segment of the first plurality of non-overlapping time segments 310a and the second plurality of non-overlapping time segments 310b corresponds to a respective segment of clean audio generated as described above.

Smoothing the segments of clean audio to generate a smoothed audio signal can include generating a plurality of sample values of the smoothed audio signal based on a linear combination of corresponding-in-time sample values from the first 310a and second 310b pluralities of time segments. The coefficients of such a linear combination could vary over time (e.g., according to a time-varying equation) to minimize the presence of noise, distortion, or other artifacts in the resulting smoothed audio signal. The coefficients of the linear combination could vary over time such that samples near the edge of a particular clean audio segment (e.g., of the first plurality of non-overlapping time segments) are weighted away from the particular clean audio segment and toward the opposite clean audio segment (e.g., of the second plurality of non-overlapping time segments).

This is illustrated by way of example in FIG. 3, which illustrates a first coefficient equation 320a ("$\beta$") and a second coefficient equation 320b ("$1-\beta$"). A sample of a smoothed audio signal could be generated according to a linear combination of a sample value from a clean audio sample from the first plurality of time segments 310a, weighted according to $\beta$, and a sample value from a clean audio sample from the second plurality of time segments 310b, weighted according to $1-\beta$. The coefficient equations 320a, 320b can be chosen such that the linear combination of sample values from clean audio of the first 310a and second 310b time segments is weighted away from sample values that are close to the edge of their respective segments of clean audio. This could be done in order to smoothly transition, alternatively, between sample values of the first and second pluralities of time segments such that, when the clean audio of one of the pluralities of time segments 'transitions' from one clean audio segment to the next, the segment of output audio is minimally based on the clean audio from that plurality of time segments.

This is illustrated by way of example at time point $t_1$ in FIG. 3. Time point $t_1$ corresponds to the edge between time segments 311b and 313b of the second plurality of time segments 310b. Correspondingly, the second coefficient equation 320b is near zero at time point $t_1$ while the first coefficient equation 320a is near maximum (unity). As time proceeds, the coefficient equations vary until, e.g., time point $t_2$ which corresponds to the edge between time segments 313a and 315a of the first plurality of time segments 310a. At time point $t_2$ the first coefficient equation 320a is near zero while the second coefficient equation 320b is near maximum (unity). As shown in FIG. 3, the coefficient equations 320a, 320b are cosine equations. However, other equations, lookup tables, or other relationships could be used to generate coefficients for generating linear combinations of overlapping clean audio segments in order to output a smoothed audio signal.

In order to protect the privacy of individuals whose audio data is used in the methods above to generate "clean" audio signals, an output audio signal could be generated as a combination (e.g., a linear combination) of a target audio signal provided by a device and/or user that is requesting the improved output audio signal and the clean audio signal and/or smoothed version thereof. By returning an output audio signal that is composed, to some degree, of audio originally provided by the requesting device and/or user, the amount of other users' audio data that is provided to the requestor can be limited. For example, the output audio signal could be a linear combination of the target audio data provided by the requestor and a cleaned and/or smoothed combination of other users' source audio signals such that the output audio signal has a similarity to the target audio data that exceeds a threshold similarity value, e.g., 70%. To ensure this degree of similarity, a coefficient used to combine the target audio signal with the cleaned and/or smoothed audio signal could be greater than a threshold value, e.g., at least 0.7.

The generated output audio signal could then be used in a variety of applications. In some examples, the output audio signal could be transmitted to a requestor device (e.g., a cellphone) that originally transmitted the target audio signal and/or requested an improved audio signal (e.g., for a video clip generated by the requestor device). Additionally or alternatively, the generated output audio signal could be made available on a video and/or audio sharing website or service, on a social media platform, or made available in some other manner (e.g., to users that have received permission to access the output audio signal).

III. EXAMPLE SYSTEMS

Figure 4:
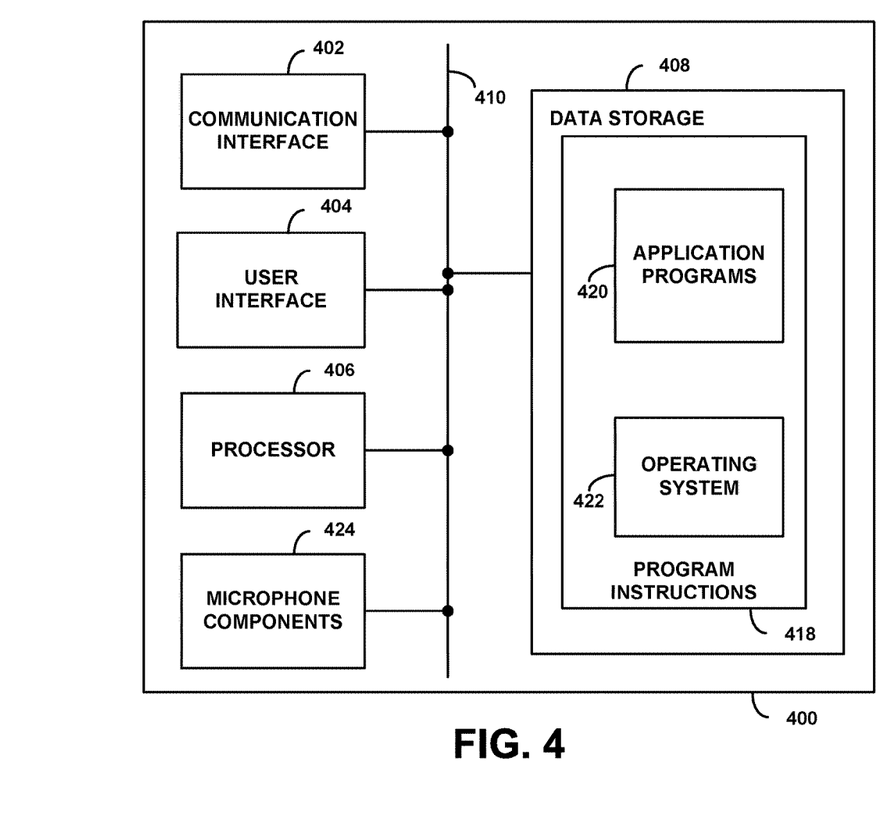
FIG. 4 is a simplified block diagram showing some of the components of an example system.

Computational functions (e.g., functions to obtain target and/or source audio signals, to select a set of source audio signals from a larger set of available audio signals, to combine source audio signals to generate segments of clean audio data, to smooth cleaned audio data) described herein may be performed by one or more computing systems. Such a computing system may be integrated into or take the form of a computing device, such as a mobile phone, tablet computer, laptop computer, server, home automation element, standalone video capture and processing device, cloud computing network, and/or programmable logic controller. For purposes of example, FIG. 4 is a simplified block diagram showing some of the components of an example computing device 400 that may include microphone components 424. Microphone components 424 may include one or more microphones or other audio detecting elements, such as electret microphones, condenser microphones, piezoelectric sensor elements, microelectromechanical microphones, pressure sensitive elements, or other types of sound-sensitive devices or elements. Alternatively, an example computing device may lack such components and receive audio signals via some other means (e.g., via the internet or some other network or other communications interface).

By way of example and without limitation, computing device 400 may be a cellular mobile telephone (e.g., a smartphone), a video camera, a stand-alone audio recorder, a computer (such as a desktop, notebook, tablet, or handheld computer), a personal digital assistant (PDA), a wearable computing device, or some other type of device that may be equipped with at some audio recording and/or audio processing capabilities. It should be understood that computing device 400 may represent a physical audio recording device, a particular physical hardware platform on which an audio capture application operates in software, or other combinations of hardware and software that are configured to carry out audio capture and/or audio processing functions.

As shown in FIG. 4, computing device 400 may include a communication interface 402, a user interface 404, a processor 406, data storage 408, and microphone components 424, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet, Universal Serial Bus (USB), or High-Definition Multimedia Interface (HDMI) port. Communication interface 402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 402 may function to allow computing device 400 to communicate, with other devices, remote servers, access networks, and/or transport networks. For example, the communication interface 402 may function to transmit an indication of an audio signal, to transmit an indication of a video stream that may include an embedded audio signal, or some other information. For example, the computing device 400 could be a cellphone, digital camera, audio recorder, or other audio capturing device and the remote system could be a computer, server, cloud computing system, or other system configured to perform the methods described herein.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

In some embodiments, user interface 404 may include a display that serves to present video streams to a user (e.g., video streams that include audio signals generated using the microphone components 424). Additionally, user interface 404 may include one or more buttons, switches, knobs, and/or dials that facilitate the configuration and operation of the microphone components 424, the capturing of audio and/or video streams using the microphone components 424, or to configure some other operation of the computing device 400. It may be possible that some or all of these buttons, switches, knobs, and/or dials are implemented as functions on a touch- or presence-sensitive panel.

Processor 406 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of audio processing, audio segment and/or template alignment, and neural network computation, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings.

By way of example, program instructions 418 may include an operating system 422 (e.g., an operating system kernel, device driver(s), and/or other modules) and one or more application programs 420 (e.g., audio and/or video recording functions, audio filtering) installed on computing device 400.

Application programs 420 may take the form of "apps" that could be downloadable to computing device 400 through one or more online application stores or application markets (via, e.g., the communication interface 402). However, application programs can also be installed on computing device 400 in other ways, such as via a web browser or through a physical interface (e.g., a USB port) of the computing device 400.

In some examples, portions of the methods described herein could be performed by different devices, according to an application. For example, different devices of a system could have different amounts of computational resources (e.g., memory, processor cycles) and different information bandwidths for communication between the devices. For example, a first device could be a cellphone or other audiovisual capture device that could transmit an audio and/or video stream to another device or server that has the necessary computational resources to perform the methods described herein to the transmitted audio stream. Different portions of the methods described herein could be apportioned according to such considerations.

IV. EXAMPLE METHODS

Figure 5:
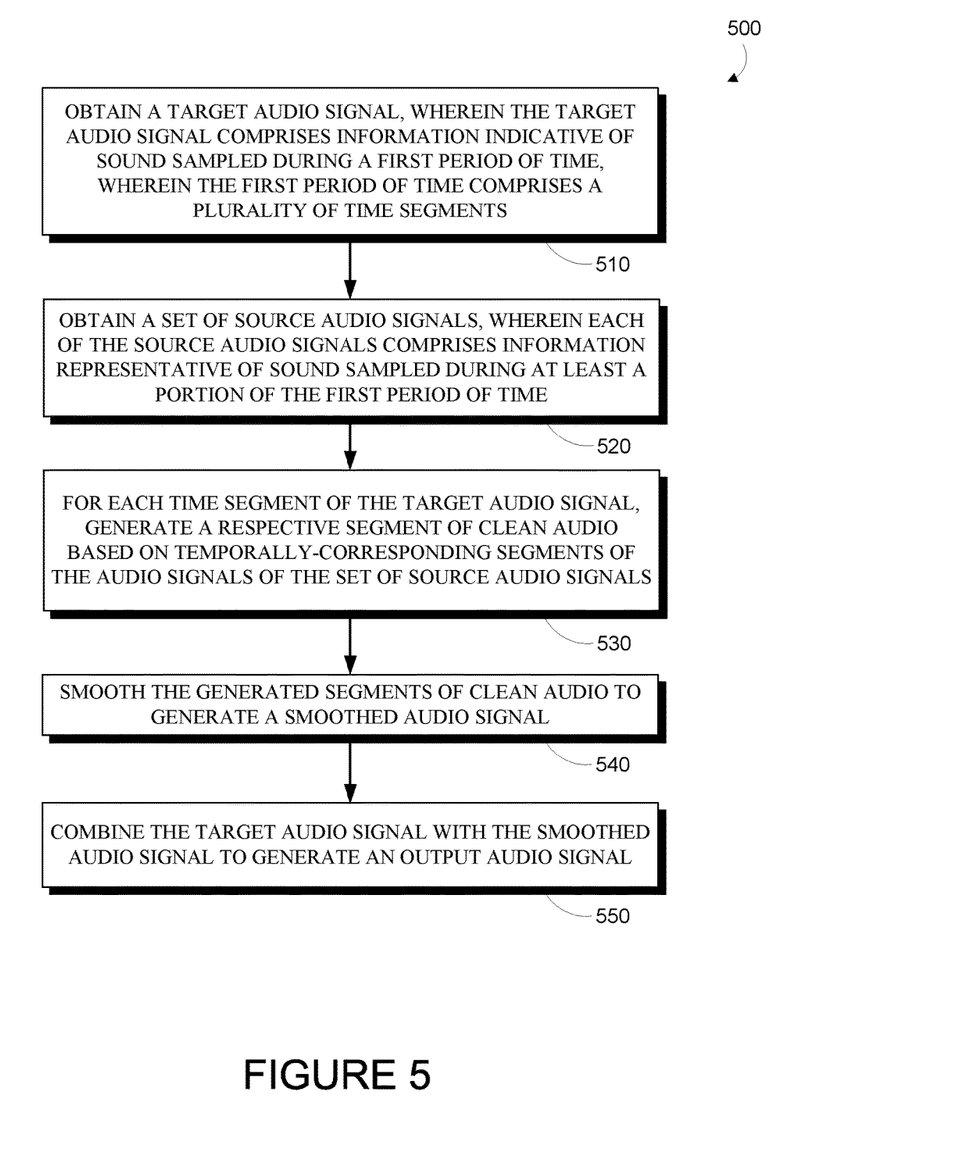
FIG. 5 is a flowchart of a method, according to an example embodiment.

FIG. 5 is a flowchart of a method 500 for generating output audio signals based on a target audio signal (e.g., generated by a cellphone or other requestor device) and one or more source audio signals (e.g., generated by additional cellphones near the requestor device at the same time as the generation of the target audio signal) that are improved relative to the target audio signal with respect to noise level, distortion, or some other measure of audio quality. The method 500 includes obtaining a target audio signal, wherein the target audio signal comprises information indicative of sound sampled during a first period of time, wherein the first period of time comprises a plurality of time segments (510). This can include generating, by a microphone, samples of the target audio signal. Additionally or alternatively, obtaining the target audio signal can include receiving an indication of the target audio signal from a device (e.g., a cellphone). Such a device could be a requestor device, e.g., a device that requests an output audio signal that is improved relative to the target audio signal and that has been generated according to the methods described herein.

The method 500 additionally includes, obtaining a set of source audio signals, wherein each of the source audio signals comprises information representative of sound sampled during at least a portion of the first period of time (520). This can include receiving indications of the source audio signals from a plurality of additional cellphones or other audio capture devices. Obtaining the set of source audio signals could include selecting the set of source audio signals from a larger set of available audio signals, e.g., based on similarity between the source audio signals and the target audio signal and/or similarity between location or other data associate with the source audio signals and the target audio signal.

The method 500 additionally includes, for each time segment of the target audio signal, generating a respective segment of clean audio based on temporally-corresponding segments of the audio signals of the set of source audio signals (530). This can include using an artificial neural network (e.g., a long short-term memory recurrent neural network) or some other method to generate mixing coefficients for each of the source audio signals and then generating the segments of clean audio as a linear combination of the source audio signals according to the determined mixing coefficients.

The method 500 additionally includes smoothing the generated segments of clean audio to generate a smoothed audio signal (540). This can include using an audio filter, generating a linear combination between two different sets of overlapping segments of clean audio, or some other method to smooth the generated segments of clean audio to generate a smoothed audio signal.

The method 500 additionally includes combining the target audio signal with the smoothed audio signal to generate an output audio signal (550).

The method 500 could include additional elements or features. For example, the generated output audio signal could be made available to a user that requested the output audio signal (e.g., by transmitting an indication of the output audio signal to the requestor device from which the target audio signal was received) or to some other individual who is authorized to access the output audio signal (e.g., via an audio and/or video hosting service, via a social media web site).

V. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

VI. ENUMERATED EXAMPLE EMBODIMENTS

Embodiments of the present disclosure may thus relate to one of the enumerated example embodiments (EEEs) listed below.

EEE 1 is a method, comprising:
obtaining a target audio signal, wherein the target audio signal comprises information indicative of sound sampled during a first period of time, wherein the first period of time comprises a plurality of time segments;
obtaining a set of source audio signals, wherein each of the source audio signals comprises information representative of sound sampled during at least a portion of the first period of time;
for each time segment of the target audio signal, generating a respective segment of clean audio based on temporally-corresponding segments of the audio signals of the set of source audio signals;
smoothing the generated segments of clean audio to generate a smoothed audio signal; and
combining the target audio signal with the smoothed audio signal to generate an output audio signal EEE 2 is the method of EEE 1, wherein obtaining the target audio signal comprises receiving the target audio signal from a requestor device, and wherein the method further comprises transmitting an indication of the output audio signal to the requestor device.

EEE 3 is the method of EEEs 1 or 2, wherein obtaining a set of source audio signals comprises:
receiving, from a plurality of remote devices, a set of respective further audio signals; and
selecting the set of source audio signals from the set of further audio signals, wherein a particular further audio signal is selected from the set of further audio signals based on at least one of: (i) a degree of temporal overlap between a further period of time represented by the particular further audio signal and the first period of time, (ii) a proximity between a location associated with the particular audio signal and a location associated with the target audio signal, (iii) a degree of similarity between a video clip associated with the particular audio signal and a video clip associated with the target audio signal, or (iv) a degree of similarity between the particular audio signal and the target audio signal.

EEE 4 is the method of EEEs 1 or 2, wherein obtaining a set of source audio signals comprises:
receiving, from a plurality of remote devices, a set of respective further audio signals; and
selecting the set of source audio signals from the set of further audio signals, wherein a particular further audio signal is selected from the set of further audio signals based on a degree of temporal overlap between a further period of time represented by the particular further audio signal and the first period of time.

EEE 5 is the method of EEEs 1 or 2, wherein obtaining a set of source audio signals comprises:
receiving, from a plurality of remote devices, a set of respective further audio signals; and
selecting the set of source audio signals from the set of further audio signals, wherein a particular further audio signal is selected from the set of further audio signals based on a proximity between a location associated with the particular audio signal and a location associated with the target audio signal.

EEE 6 is the method of EEEs 1 or 2, wherein obtaining a set of source audio signals comprises:
receiving, from a plurality of remote devices, a set of respective further audio signals; and
selecting the set of source audio signals from the set of further audio signals, wherein a particular further audio signal is selected from the set of further audio signals based on a degree of similarity between a video clip associated with the particular audio signal and a video clip associated with the target audio signal.

EEE 7 is the method of EEEs 1 or 2, wherein obtaining a set of source audio signals comprises:
receiving, from a plurality of remote devices, a set of respective further audio signals; and
selecting the set of source audio signals from the set of further audio signals, wherein a particular further audio signal is selected from the set of further audio signals based on a degree of similarity between the particular audio signal and the target audio signal.

EEE 8 is the method of any of EEEs 3-7, wherein selecting the set of source audio signals from the set of further audio signals further comprises:
determining, for each audio signal of the set of further audio signals, an audio quality value; and discarding or discounting further audio signals from the set of further audio signals that have an audio quality value less than a specified threshold.

EEE 9 is the method of EEE 8, wherein selecting the set of source audio signals from the set of further audio signals comprises selecting a set of source audio signals such that each time segment of the plurality of time segments of the first period of time is represented by at least a threshold number of source audio signals of the selected set of source audio signals EEE 10 is the method of any of EEEs 1-9, further comprising:

selecting, from a set comprising the target audio signal and the set of source audio signals, a template audio signal; and determining a time offset between the template audio signal and each of the non-selected audio signals of the set comprising the target audio signal and the set of source audio signals, wherein generating a segment of clean audio based on a temporally-corresponding segment of a given audio signal of the set of audio signals comprises selecting the temporally-corresponding segment of the given audio signal based on the time offset determined between the template audio signal and the given audio signal.

EEE 11 is the method of EEE 10, wherein selecting the template audio signal comprises:

determining, for each audio signal in the set comprising the target audio signal and the set of source audio signals, a peakedness value, wherein determining a peakedness value for a particular audio signal comprises:

identifying a maximal-magnitude time point within the particular audio signal;

determining a magnitude of the particular audio signal at the maximal-magnitude time point;

determining a median of the particular audio signal within a specified-duration time period that includes the maximal-magnitude time point; and determining a ratio between the determined magnitude and the determined median EEE 12 is the method of any of EEEs 1-11, wherein the plurality of time segments comprises a first plurality of non-overlapping time segments and a second plurality of non-overlapping time segments, wherein time segments of the first plurality of time segments overlap in time with time segments of the second plurality of time segments, wherein smoothing the generated segments of clean audio to generate a smoothed audio signal comprises generating a plurality of sample values of the smoothed audio signal, and wherein generating a particular sample value of the smoothed audio signal comprises generating a linear combination of a sample value of a time segment of the first plurality of time segments and a sample value of a time segment of the second plurality of time segments.

EEE 13 is the method of any of EEEs 1-12, wherein combining the target audio signal with the smoothed audio signal to generate an output audio signal comprising generating a linear combination of the smoothed audio signal and the target audio signal, wherein a similarity between the target audio signal and the generated linear combination is greater than a threshold similarity value.

EEE 14 is the method of any of EEEs 1-13, wherein generating a segment of clean audio based on corresponding segments of the audio signals of the set of audio signals comprises:

using a long short-term memory recurrent neural network to determine mixing coefficients for each of the audio signals of the set of audio signals; and generating, according to the determined mixing coefficients, a linear combination of the audio signals of the set of audio signals.

EEE 15 is a computer-readable medium, having stored thereon program instructions that, upon execution by a computing device, cause the computing device to perform the method of any of EEEs 1-14.

EEE 16 is a device comprising a controller, wherein the controller is programmed to perform the method of any of EEEs 1-14.

We claim:

1. A method comprising:

receiving a target audio signal from a requestor device, wherein the target audio signal comprises information indicative of sound sampled during a first period of time, wherein the first period of time comprises a plurality of time segments;

obtaining a set of source audio signals, wherein each of the source audio signals comprises information indicative of sound sampled during at least a portion of the first period of time;

for each time segment of the target audio signal, generating a respective segment of clean audio based on temporally-corresponding segments of the audio signals of the set of source audio signals;

smoothing the generated segments of clean audio to generate a smoothed audio signal;

combining the target audio signal with the smoothed audio signal to generate an output audio signal; and transmitting an indication of the output audio signal to the requestor device.

2. The method of claim 1, wherein obtaining a set of source audio signals comprises:

receiving, from a plurality of remote devices, a set of respective further audio signals; and selecting the set of source audio signals from the set of further audio signals, wherein a particular further audio signal is selected from the set of further audio signals based on at least one of: (i) a degree of temporal overlap between a further period of time represented by the particular further audio signal and the first period of time, (ii) a proximity between a location associated with the particular audio signal and a location associated with the target audio signal, (iii) a degree of similarity between a video clip associated with the particular audio signal and a video clip associated with the target audio signal, or (iv) a degree of similarity between the particular audio signal and the target audio signal.

3. The method of claim 2, wherein selecting the set of source audio signals from the set of further audio signals further comprises:

determining, for each audio signal of the set of further audio signals, an audio quality value; and discarding or discounting further audio signals from the set of further audio signals that have an audio quality value less than a specified threshold.

4. The method of claim 3, wherein selecting the set of source audio signals from the set of further audio signals comprises selecting a set of source audio signals such that each time segment of the plurality of time segments of the first period of time is represented by at least a threshold number of source audio signals of the selected set of source audio signals.

5. The method of claim 1, further comprising:
selecting, from a set comprising the target audio signal and the set of source audio signals, a template audio signal; and
determining a time offset between the template audio signal and each of the non-selected audio signals of the set comprising the target audio signal and the set of source audio signals, wherein generating a segment of clean audio based on a temporally-corresponding segment of a given audio signal of the set of audio signals comprises selecting the temporally-corresponding segment of the given audio signal based on the time offset determined between the template audio signal and the given audio signal.

6. The method of claim 5, wherein selecting the template audio signal comprises:
determining, for each audio signal in the set comprising the target audio signal and the set of source audio signals, a peakedness value, wherein determining a peakedness value for a particular audio signal comprises:
identifying a maximal-magnitude time point within the particular audio signal;
determining a magnitude of the particular audio signal at the maximal-magnitude time point;
determining a median of the particular audio signal within a specified-duration time period that includes the maximal-magnitude time point; and
determining a ratio between the determined magnitude and the determined median.

7. The method of claim 1, wherein the plurality of time segments comprises a first plurality of non-overlapping time segments and a second plurality of non-overlapping time segments, wherein time segments of the first plurality of time segments overlap in time with time segments of the second plurality of time segments, wherein smoothing the generated segments of clean audio to generate a smoothed audio signal comprises generating a plurality of sample values of the smoothed audio signal, and wherein generating a particular sample value of the smoothed audio signal comprises generating a linear combination of a sample value of a time segment of the first plurality of time segments and a sample value of a time segment of the second plurality of time segments.

8. The method of claim 1, wherein combining the target audio signal with the smoothed audio signal to generate an output audio signal comprises generating a linear combination of the smoothed audio signal and the target audio signal, and wherein a similarity between the target audio signal and the generated linear combination is greater than a threshold similarity value.

9. The method of claim 1, wherein generating a segment of clean audio based on corresponding segments of the audio signals of the set of audio signals comprises:
using a long short-term memory recurrent neural network to determine mixing coefficients for each of the audio signals of the set of audio signals; and
generating, according to the determined mixing coefficients, a linear combination of the audio signals of the set of audio signals.

10. The method of claim 1, wherein generating a segment of clean audio based on corresponding segments of the audio signals of the set of audio signals comprises:
determining mixing coefficients for each of the audio signals of the set of audio signals, wherein the determined mixing coefficients do not exceed a threshold value; and
generating, according to the determined mixing coefficients, a linear combination of the audio signals of the set of audio signals.

11. A non-transitory computer-readable medium, having stored thereon program instructions that, upon execution by a computing device, cause the computing device to perform operations comprising:
receiving a target audio signal from a requestor device, wherein the target audio signal comprises information indicative of sound sampled during a first period of time, wherein the first period of time comprises a plurality of time segments;
obtaining a set of source audio signals, wherein each of the source audio signals comprises information indicative of sound sampled during at least a portion of the first period of time;
for each time segment of the target audio signal, generating a respective segment of clean audio based on temporally-corresponding segments of the audio signals of the set of source audio signals;
smoothing the generated segments of clean audio to generate a smoothed audio signal;
combining the target audio signal with the smoothed audio signal to generate an output audio signal; and
transmitting an indication of the output audio signal to the requestor device.

12. The non-transitory computer-readable medium of claim 11, wherein obtaining a set of source audio signals comprises:
receiving, from a plurality of remote devices, a set of respective further audio signals; and
selecting the set of source audio signals from the set of further audio signals, wherein a particular further audio signal is selected from the set of further audio signals based on at least one of: (i) a degree of temporal overlap between a further period of time represented by the particular further audio signal and the first period of time, (ii) a proximity between a location associated with the particular audio signal and a location associated with the target audio signal, (iii) a degree of similarity between a video clip associated with the particular audio signal and a video clip associated with the target audio signal, or (iv) a degree of similarity between the particular audio signal and the target audio signal.

13. The non-transitory computer-readable medium of claim 12, wherein selecting the set of source audio signals from the set of further audio signals further comprises:
determining, for each audio signal of the set of further audio signals, an audio quality value; and
discarding or discounting further audio signals from the set of further audio signals that have an audio quality value less than a specified threshold.

14. The non-transitory computer-readable medium of claim 13, wherein selecting the set of source audio signals from the set of further audio signals comprises selecting a set of source audio signals such that each time segment of the plurality of time segments of the first period of time is represented by at least a threshold number of source audio signals of the selected set of source audio signals.

15. The non-transitory computer-readable medium of claim 11, wherein the operations further comprise:
selecting, from a set comprising the target audio signal and the set of source audio signals, a template audio signal; and
determining a time offset between the template audio signal and each of the non-selected audio signals of the set comprising the target audio signal and the set of source audio signals, wherein generating a segment of clean audio based on a temporally-corresponding segment of a given audio signal of the set of audio signals comprises selecting the temporally-corresponding segment of the given audio signal based on the time offset determined between the template audio signal and the given audio signal.

16. The non-transitory computer-readable medium of claim 11, wherein the plurality of time segments comprises a first plurality of non-overlapping time segments and a second plurality of non-overlapping time segments, wherein time segments of the first plurality of time segments overlap in time with time segments of the second plurality of time segments, wherein smoothing the generated segments of clean audio to generate a smoothed audio signal comprises generating a plurality of sample values of the smoothed audio signal, and wherein generating a particular sample value of the smoothed audio signal comprises generating a linear combination of a sample value of a time segment of the first plurality of time segments and a sample value of a time segment of the second plurality of time segments.

17. The non-transitory computer-readable medium of claim 11, wherein combining the target audio signal with the smoothed audio signal to generate an output audio signal comprises generating a linear combination of the smoothed audio signal and the target audio signal, and wherein a similarity between the target audio signal and the generated linear combination is greater than a threshold similarity value.

18. The non-transitory computer-readable medium of claim 11, wherein generating a segment of clean audio based on corresponding segments of the audio signals of the set of audio signals comprises:

using a long short-term memory recurrent neural network to determine mixing coefficients for each of the audio signals of the set of audio signals; and generating, according to the determined mixing coefficients, a linear combination of the audio signals of the set of audio signals.

19. The non-transitory computer-readable medium of claim 11, wherein generating a segment of clean audio based on corresponding segments of the audio signals of the set of audio signals comprises:

determining mixing coefficients for each of the audio signals of the set of audio signals, wherein the determined mixing coefficients do not exceed a threshold value; and generating, according to the determined mixing coefficients, a linear combination of the audio signals of the set of audio signals.

20. A method comprising:

obtaining a target audio signal, wherein the target audio signal comprises information indicative of sound sampled during a first period of time, wherein the first period of time comprises a plurality of time segments;

obtaining a set of source audio signals, wherein each of the source audio signals comprises information representative of sound sampled during at least a portion of the first period of time;

for each time segment of the target audio signal, generating a respective segment of clean audio based on temporally-corresponding segments of the audio signals of the set of source audio signals;

smoothing the generated segments of clean audio to generate a smoothed audio signal; and combining the target audio signal with the smoothed audio signal to generate an output audio signal.

* * * * *